US011154985B1

(12) United States Patent
Strauss

(10) Patent No.: US 11,154,985 B1
(45) Date of Patent: Oct. 26, 2021

(54) NULL SPACE JOG CONTROL FOR ROBOTIC ARM

(71) Applicant: X Development LLC, Mountain View, CA (US)

(72) Inventor: Marc Strauss, Fremont, CA (US)

(73) Assignee: X Development LLC, Mountain View, CA (US)

( * ) Notice: Subject to any disclaimer, the term of this patent is extended or adjusted under 35 U.S.C. 154(b) by 239 days.

(21) Appl. No.: 16/460,102

(22) Filed: Jul. 2, 2019

(51) Int. Cl.
*B25J 9/16* (2006.01)
*B25J 9/06* (2006.01)
*B25J 9/02* (2006.01)

(52) U.S. Cl.
CPC .............. *B25J 9/1602* (2013.01); *B25J 9/02* (2013.01); *B25J 9/06* (2013.01); *B25J 9/1669* (2013.01)

(58) Field of Classification Search
CPC ..... B25J 9/02; B25J 9/06; B25J 9/1602; B25J 9/1669; B25J 18/007; G05B 2219/39414; G05B 2219/39422; G05B 2219/36427; G05B 2219/40367; G05B 2219/39427; G05B 2219/35438; G06F 2203/04105
See application file for complete search history.

(56) References Cited

U.S. PATENT DOCUMENTS

| 5,430,643 | A | 7/1995 | Seraji | |
| 2008/0255704 | A1* | 10/2008 | Braut | B25J 19/06 |
| | | | | 700/264 |
| 2010/0145520 | A1* | 6/2010 | Gerio | G05B 19/425 |
| | | | | 700/264 |
| 2010/0312391 | A1* | 12/2010 | Choi | B25J 9/1656 |
| | | | | 700/254 |
| 2012/0130541 | A1* | 5/2012 | Szalek | B25J 13/085 |
| | | | | 700/258 |
| 2014/0074289 | A1* | 3/2014 | Xiao | B25J 9/163 |
| | | | | 700/254 |
| 2014/0195054 | A1* | 7/2014 | Kamiya | B25J 13/06 |
| | | | | 700/263 |
| 2014/0276953 | A1 | 9/2014 | Swarup et al. | |
| 2015/0323398 | A1* | 11/2015 | Lauzier | B25J 9/0081 |
| | | | | 73/862.08 |
| 2018/0074475 | A1 | 3/2018 | Schreiber et al. | |
| 2018/0290301 | A1* | 10/2018 | Haddadin | B25J 9/1656 |

* cited by examiner

*Primary Examiner* — Dale Moyer
(74) *Attorney, Agent, or Firm* — McDonnell Boehnen Hulbert & Berghoff LLP

(57) ABSTRACT

A method includes receiving input data indicative of tactile input at a bidirectional jog control device associated with a seven-degree-of-freedom (7DOF) robotic arm, where the 7DOF robotic arm is in a first arm configuration with an end effector of the 7DOF robotic arm positioned at a first pose in an environment. Based on the input data, the method further includes determining a direction to jog the 7DOF robotic arm through a null space while keeping the end effector fixed at the first pose in the environment. The method additionally includes controlling the 7DOF robotic arm to jog through the null space in the determined direction to a second arm configuration, where the end effector is positioned at the first pose in the environment when the 7DOF robotic arm is in the second arm configuration.

17 Claims, 9 Drawing Sheets

NULL SPACE JOG CONTROL FOR ROBOTIC ARM

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

SUMMARY

Example embodiments involve a bidirectional jog control device for a seven-degree-of-freedom (7DOF) robotic arm. The control device may allow for intuitive user control to move the robotic arm in either direction through the null space.

In an embodiment, a method includes receiving input data indicative of tactile input at a bidirectional jog control device associated with a 7DOF robotic arm, where the 7DOF robotic arm is in a first arm configuration with an end effector of the 7DOF robotic arm positioned at a first pose in an environment. Based on the input data, the method further includes determining a direction to jog the 7DOF robotic arm through a null space while keeping the end effector fixed at the first pose in the environment. The method additionally includes controlling the 7DOF robotic arm to jog through the null space in the determined direction to a second arm configuration, where the end effector is positioned at the first pose in the environment when the 7DOF robotic arm is in the second arm configuration.

In another embodiment, a robotic device includes a 7DOF robotic arm having an end effector, a bidirectional jog control device, and a control system. The control system is configured to receive input data indicative of tactile input at the bidirectional jog control device associated with the 7DOF robotic arm, where the 7DOF robotic arm is in a first arm configuration with the end effector of the 7DOF robotic arm positioned at a first pose in an environment. Based on the input data, the control system is further configured to determine a direction to jog the 7DOF robotic arm through a null space while keeping the end effector fixed at the first pose in the environment. The control system is additionally configured to control the 7DOF robotic arm to jog through the null space in the determined direction to a second arm configuration, where the end effector is positioned at the first pose in the environment when the 7DOF robotic arm is in the second arm configuration.

In a further embodiment, a non-transitory computer readable medium is provided which includes programming instructions executable by at least one processor to cause the at least one processor to perform functions. The functions include receiving input data indicative of tactile input at a bidirectional jog control device associated with a 7DOF robotic arm, where the 7DOF robotic arm is in a first arm configuration with an end effector of the 7DOF robotic arm positioned at a first pose in an environment. The functions further include based on the input data, determining a direction to jog the 7DOF robotic arm through a null space while keeping the end effector fixed at the first pose in the environment. The functions also include controlling the 7DOF robotic arm to jog through the null space in the determined direction to a second arm configuration, where the end effector is positioned at the first pose in the environment when the 7DOF robotic arm is in the second arm configuration.

In another embodiment, a system is provided that includes means for receiving input data indicative of tactile input at a bidirectional jog control device associated with a 7DOF robotic arm, where the 7DOF robotic arm is in a first arm configuration with an end effector of the 7DOF robotic arm positioned at a first pose in an environment. The system further includes means for determining, based on the input data, a direction to jog the 7DOF robotic arm through a null space while keeping the end effector fixed at the first pose in the environment. The system also includes means for controlling the 7DOF robotic arm to jog through the null space in the determined direction to a second arm configuration, where the end effector is positioned at the first pose in the environment when the 7DOF robotic arm is in the second arm configuration.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
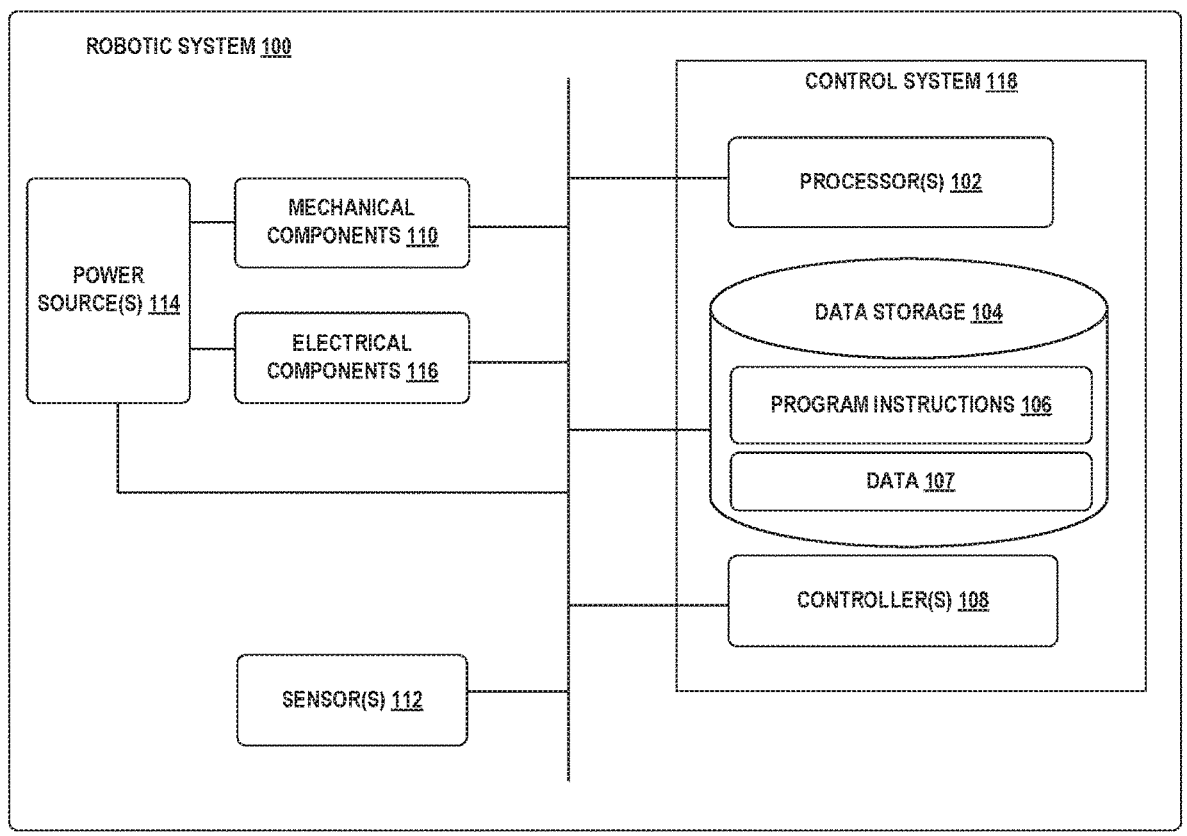
FIG. 1 illustrates a configuration of a robotic system, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Overview

On a robotic arm with six degrees of freedom (6DOFs), the desired pose (i.e., position and orientation in free space) of the end effector specifies the required arm kinematics. However, for a robotic arm with greater than 6 DOFs such as a seven-degree-of-freedom (7DOF) robotic arm, there are infinite joint configurations which satisfy the desired pose. Joint moves can be performed in coordination according to a joint angle basis vector within the null space of the configuration-specific Jacobian (kinematic) matrix representation such that the end effector remains motionless in space while the upstream joints of the arm above the end effector move in coordination.

When teaching behaviors to a learning robot (also referred to as a co-bot), it may be desirable to maintain a specified pose of the end effector of a robotic arm and meanwhile reconfigure the joint angles of the upstream robot link segments. For instance, the joint angles may be adjusted to allow the robotic arm to position the end effector while avoiding obstacles in the environment. For a 7DOF robotic arm, there exist a single infinity of joint angle solutions to a specified kinematic pose. These solutions correspond to a one-dimensional (1D) curve in joint angle configuration space: for each specific arm configuration along the curve, the joints move in proportion to the joint-configuration-specific Jacobian null space basis vector.

The configuration of a 6DOF robotic arm can be jogged manually by specifying the individual joint angles, but typically the desired configuration is driven by the pose of the end effector. This end effector pose can be achieved by jogging the 6DOFs of the pose in the world frame through a computer or pendant interface, or even by more intuitive means such as a wrist-mounted force/torque sensor whereby physically pushing, pulling, and/or twisting the end effector drives the robot arm pose.

In any case, specifying the end effector pose under-specifies the complete set of joint angles for robotic arms with more than 6DOFs. For these robotic arms, a kinematic planning algorithm may be applied to automatically select a complete joint-angle configuration solution, such as an algorithm designed to keep the kinematic configuration maximally-distant (in joint configuration space) from "singularities," or configurations in which the robotic arm is unable to achieve motion in a desired direction (e.g., because multiple joint axes become aligned). Singularities are undesirable for robust motion controllability and generally result in non-intuitive and unpredictable robot motion and velocities. A singularity results in the reduction in order of the Jacobian (kinematic) matrix, effectively eliminating one or more achievable DOFs.

In some scenarios, when teaching a behavior (or just a specific end effector pose) to a learning robot, the automatically-selected (or de facto) arm configuration may not be the operator-preferred configuration. For example, in the case of a nearby obstacle, an arm configuration which keeps the robotic arm a certain distance from the obstacle may be preferred. In such a situation, it may be more desirable to avoid collision than to stay maximally-distant (in joint configuration space) from a singularity. Jogging a robotic arm through the null space allows an operator to shift the upper links of the robotic arm without moving or reorienting the end effector pose.

In some examples, a robotic arm has torque sensing at each joint, which is quite expensive to implement, but allows sensing of an operator pushing on different parts of the arm, such as the elbow. However, other example robotic arms do not have joint-torque sensing, in which case an operator pushing on different parts of the arm would not be sensed. Many co-bots do not have this joint torque sensing for affordability reasons. Some robotic arms which do not have joint torque sensing instead include a wrist-mounted force/torque sensor to allow an operator to manually position the end effector in free space.

Example embodiments described herein use a bidirectional jog control device that allows for intuitive jogging of a robotic arm through the null space via tactile (i.e., physical touch) input. In some such examples, the job control device includes a rocker switch for bidirectional control. In further examples, the jog control device includes two opposing switches, a click wheel, a center-return knob, or a different type of mechanical input modality.

In some examples, the jog control device may be mounted on the robotic arm, such as on the elbow (or nearby). For various tasks, motion through the null space can tend to result in elbow inversion for a human-style arm, so locating the switch on the elbow may be a user-convenient location. For illustration, because a human has 7DOF arms, a golf instructor may guide a player's elbow as well as the player's hand in order to specify proper golfing form. In a similar fashion, an operator of a learning robot may guide the robotic arm by simultaneously placing one hand on the end effector, and the other hand on the jog control device located at the elbow.

In other examples, the jog control device may be placed elsewhere on the robotic arm. For instance, the jog control device may be positioned on or nearby the wrist to allow for easy simultaneous manual positioning of the end effector while also jogging the robotic arm through the null space (e.g., with a single hand of an operator).

In further examples, a robotic arm may have greater than 7DOFs. For robotic arms with greater than 7DOFs (e.g., for an eight-degree-of-freedom or 8DOF robotic arm), one or more jog control devices may allow for a multidimensional jog through the kinematic null space. For instance, multiple switches may be included on the robotic arm to allow an operator to jog the robotic arm through different dimensions of the null space.

II. Example Robotic Systems

FIG. 1 illustrates an example configuration of a robotic system that may be used in connection with the implementations described herein. Robotic system 100 may be configured to operate autonomously, semi-autonomously, or using directions provided by user(s). Robotic system 100 may be implemented in various forms, such as a robotic arm, industrial robot, or some other arrangement. Some example implementations involve a robotic system 100 engineered to be low cost at scale and designed to support a variety of tasks. Robotic system 100 may be designed to be capable of operating around people. Robotic system 100 may also be optimized for machine learning. Throughout this description, robotic system 100 may also be referred to as a robot, robotic device, or mobile robot, among other designations.

As shown in FIG. 1, robotic system 100 may include processor(s) 102, data storage 104, and controller(s) 108, which together may be part of control system 118. Robotic system 100 may also include sensor(s) 112, power source(s) 114, mechanical components 110, and electrical components 116. Nonetheless, robotic system 100 is shown for illustrative purposes, and may include more or fewer components. The various components of robotic system 100 may be connected in any manner, including wired or wireless connections. Further, in some examples, components of robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). Processor(s) 102 may be configured to execute computer-readable program instructions 106, and manipulate data 107, both of which are stored in data storage 104. Processor(s) 102 may also directly or indirectly interact with other components of robotic system 100, such as sensor(s) 112, power source(s) 114, mechanical components 110, or electrical components 116.

Data storage 104 may be one or more types of hardware memory. For example, data storage 104 may include or take the form of one or more computer-readable storage media that can be read or accessed by processor(s) 102. The one or more computer-readable storage media can include volatile or non-volatile storage components, such as optical, magnetic, organic, or another type of memory or storage, which can be integrated in whole or in part with processor(s) 102. In some implementations, data storage 104 can be a single physical device. In other implementations, data storage 104 can be implemented using two or more physical devices, which may communicate with one another via wired or wireless communication. As noted previously, data storage 104 may include the computer-readable program instructions 106 and data 107. Data 107 may be any type of data, such as configuration data, sensor data, or diagnostic data, among other possibilities.

Controller 108 may include one or more electrical circuits, units of digital logic, computer chips, or microprocessors that are configured to (perhaps among other tasks), interface between any combination of mechanical components 110, sensor(s) 112, power source(s) 114, electrical components 116, control system 118, or a user of robotic system 100. In some implementations, controller 108 may be a purpose-built embedded device for performing specific operations with one or more subsystems of the robotic system 100.

Control system 118 may monitor and physically change the operating conditions of robotic system 100. In doing so, control system 118 may serve as a link between portions of robotic system 100, such as between mechanical components 110 or electrical components 116. In some instances, control system 118 may serve as an interface between robotic system 100 and another computing device. Further, control system 118 may serve as an interface between robotic system 100 and a user. In some instances, control system 118 may include various components for communicating with robotic system 100, including a joystick, buttons, or ports, etc. The example interfaces and communications noted above may be implemented via a wired or wireless connection, or both. Control system 118 may perform other operations for robotic system 100 as well.

During operation, control system 118 may communicate with other systems of robotic system 100 via wired or wireless connections, and may further be configured to communicate with one or more users of the robot. As one possible illustration, control system 118 may receive an input (e.g., from a user or from another robot) indicating an instruction to perform a requested task, such as to pick up and move an object from one location to another location. Based on this input, control system 118 may perform operations to cause the robotic system 100 to make a sequence of movements to perform the requested task. As another illustration, a control system may receive an input indicating an instruction to move to a requested location. In response, control system 118 (perhaps with the assistance of other components or systems) may determine a direction and speed to move robotic system 100 through an environment en route to the requested location.

Operations of control system 118 may be carried out by processor(s) 102. Alternatively, these operations may be carried out by controller(s) 108, or a combination of processor(s) 102 and controller(s) 108. In some implementations, control system 118 may partially or wholly reside on a device other than robotic system 100, and therefore may at least in part control robotic system 100 remotely.

Mechanical components 110 represent hardware of robotic system 100 that may enable robotic system 100 to perform physical operations. As a few examples, robotic system 100 may include one or more physical members, such as an arm, an end effector, a head, a neck, a torso, a base, and wheels. The physical members or other parts of robotic system 100 may further include actuators arranged to move the physical members in relation to one another. Robotic system 100 may also include one or more structured bodies for housing control system 118 or other components, and may further include other types of mechanical components. The particular mechanical components 110 used in a given robot may vary based on the design of the robot, and may also be based on the operations or tasks the robot may be configured to perform.

In some examples, mechanical components 110 may include one or more removable components. Robotic system 100 may be configured to add or remove such removable components, which may involve assistance from a user or another robot. For example, robotic system 100 may be configured with removable end effectors or digits that can be replaced or changed as needed or desired. In some implementations, robotic system 100 may include one or more removable or replaceable battery units, control systems, power systems, bumpers, or sensors. Other types of removable components may be included within some implementations.

Robotic system 100 may include sensor(s) 112 arranged to sense aspects of robotic system 100. Sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, or cameras, among other possibilities. Within some examples, robotic system 100 may be configured to receive sensor data from sensors that are physically separated from the robot (e.g., sensors that are positioned on other robots or located within the environment in which the robot is operating).

Sensor(s) 112 may provide sensor data to processor(s) 102 (perhaps by way of data 107) to allow for interaction of robotic system 100 with its environment, as well as monitoring of the operation of robotic system 100. The sensor data may be used in evaluation of various factors for activation, movement, and deactivation of mechanical components 110 and electrical components 116 by control system 118. For example, sensor(s) 112 may capture data corresponding to the terrain of the environment or location of nearby objects, which may assist with environment recognition and navigation.

In some examples, sensor(s) 112 may include RADAR (e.g., for long-range object detection, distance determination, or speed determination), LIDAR (e.g., for short-range object detection, distance determination, or speed determination), SONAR (e.g., for underwater object detection, distance determination, or speed determination), VICON® (e.g., for motion capture), one or more cameras (e.g., stereoscopic cameras for 3D vision), a global positioning system (GPS) transceiver, or other sensors for capturing information of the environment in which robotic system 100 is operating. Sensor(s) 112 may monitor the environment in real time, and detect obstacles, elements of the terrain, weather conditions, temperature, or other aspects of the environment. In another example, sensor(s) 112 may capture data corresponding to one or more characteristics of a target or identified object, such as a size, shape, profile, structure, or orientation of the object.

Further, robotic system 100 may include sensor(s) 112 configured to receive information indicative of the state of robotic system 100, including sensor(s) 112 that may monitor the state of the various components of robotic system 100. Sensor(s) 112 may measure activity of systems of robotic system 100 and receive information based on the operation of the various features of robotic system 100, such as the operation of an extendable arm, an end effector, or other mechanical or electrical features of robotic system 100. The data provided by sensor(s) 112 may enable control system 118 to determine errors in operation as well as monitor overall operation of components of robotic system 100.

As an example, robotic system 100 may use force/torque sensors to measure load on various components of robotic system 100. In some implementations, robotic system 100 may include one or more force/torque sensors on an arm or end effector to measure the load on the actuators that move one or more members of the arm or end effector. In some examples, the robotic system 100 may include a force/torque sensor at or near the wrist or end effector, but not at or near other joints of a robotic arm. In further examples, robotic system 100 may use one or more position sensors to sense the position of the actuators of the robotic system. For instance, such position sensors may sense states of extension, retraction, positioning, or rotation of the actuators on an arm or end effector.

As another example, sensor(s) 112 may include one or more velocity or acceleration sensors. For instance, sensor(s) 112 may include an inertial measurement unit (IMU). The IMU may sense velocity and acceleration in the world frame, with respect to the gravity vector. The velocity and acceleration sensed by the IMU may then be translated to that of robotic system 100 based on the location of the IMU in robotic system 100 and the kinematics of robotic system 100.

Robotic system 100 may include other types of sensors not explicitly discussed herein. Additionally or alternatively, the robotic system may use particular sensors for purposes not enumerated herein.

Robotic system 100 may also include one or more power source(s) 114 configured to supply power to various components of robotic system 100. Among other possible power systems, robotic system 100 may include a hydraulic system, electrical system, batteries, or other types of power systems. As an example illustration, robotic system 100 may include one or more batteries configured to provide charge to components of robotic system 100. Some of mechanical components 110 or electrical components 116 may each connect to a different power source, may be powered by the same power source, or be powered by multiple power sources.

Any type of power source may be used to power robotic system 100, such as electrical power or a gasoline engine. Additionally or alternatively, robotic system 100 may include a hydraulic system configured to provide power to mechanical components 110 using fluid power. Components of robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of robotic system 100. Power source(s) 114 may charge using various types of charging, such as wired connections to an outside power source, wireless charging, combustion, or other examples.

Electrical components 116 may include various mechanisms capable of processing, transferring, or providing electrical charge or electric signals. Among possible examples, electrical components 116 may include electrical wires, circuitry, or wireless communication transmitters and receivers to enable operations of robotic system 100. Electrical components 116 may interwork with mechanical components 110 to enable robotic system 100 to perform various operations. Electrical components 116 may be configured to provide power from power source(s) 114 to the various mechanical components 110, for example. Further, robotic system 100 may include electric motors. Other examples of electrical components 116 may exist as well.

Robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to operate in tight spaces may have a relatively tall, narrow body. Further, the body or the other components may be developed using various types of materials, such as metals or plastics. Within other examples, a robot may have a body with a different structure or made of various types of materials.

The body or the other components may include or carry sensor(s) 112. These sensors may be positioned in various locations on the robotic system 100, such as on a body, a head, a neck, a base, an arm, or an end effector, among other examples.

Robotic system 100 may be configured to carry a load, such as a type of cargo that is to be transported. In some examples, the load may be placed by the robotic system 100 into a bin or other container attached to the robotic system 100. The load may also represent external batteries or other types of power sources (e.g., solar panels) that the robotic system 100 may utilize. Carrying the load represents one example use for which the robotic system 100 may be configured, but the robotic system 100 may be configured to perform other operations as well.

As noted above, robotic system 100 may include various types of appendages, wheels, end effectors, gripping devices and so on. In some examples, robotic system 100 may include a mobile base with wheels, treads, or some other form of locomotion. Additionally, robotic system 100 may include a robotic arm or some other form of robotic manipulator. In the case of a mobile base, the base may be considered as one of mechanical components 110 and may include wheels, powered by one or more of actuators, which allow for mobility of a robotic arm in addition to the rest of the body.

Figure 2:
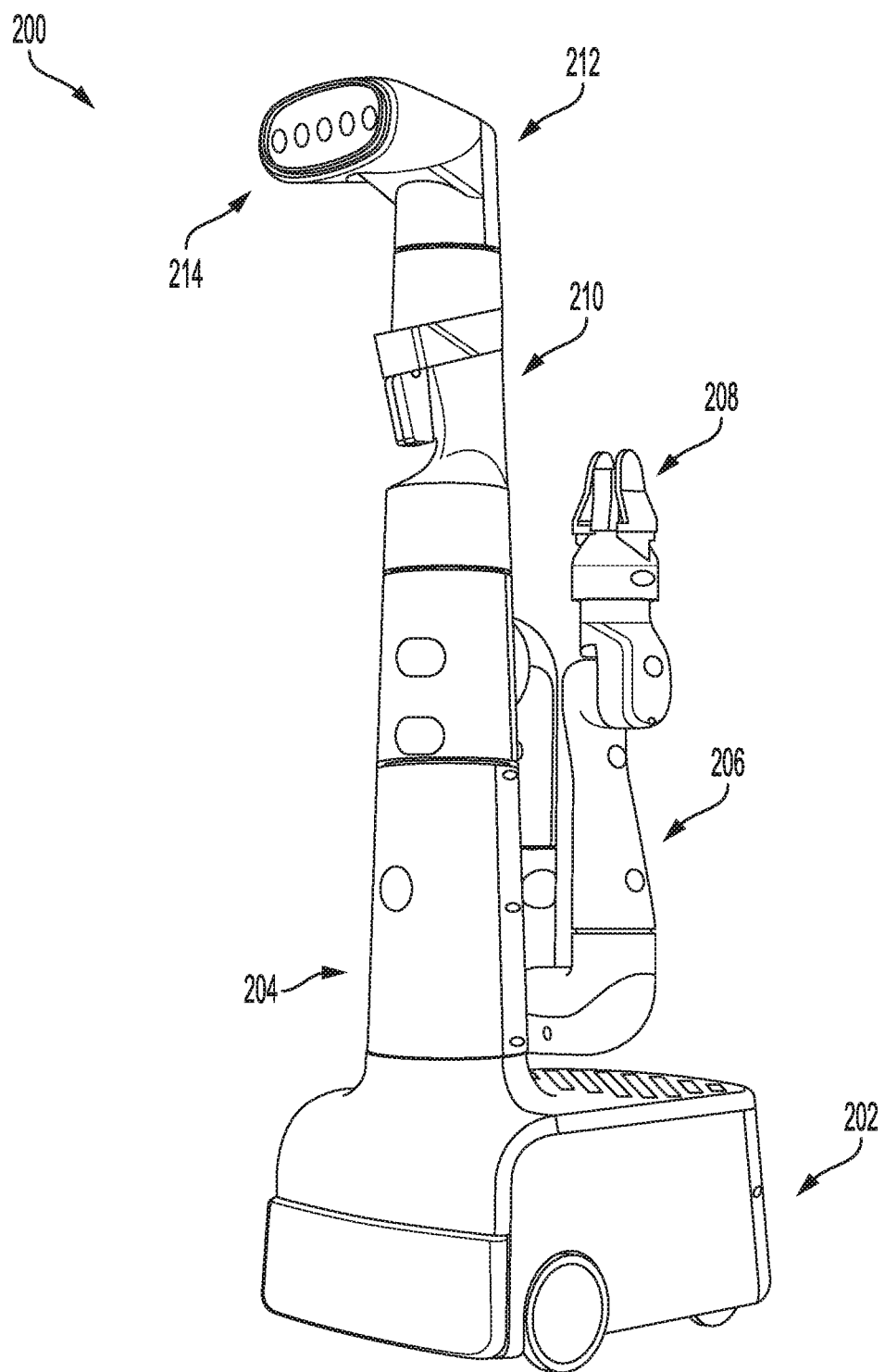
FIG. 2 illustrates a mobile robot, in accordance with example embodiments.
Figure 3:
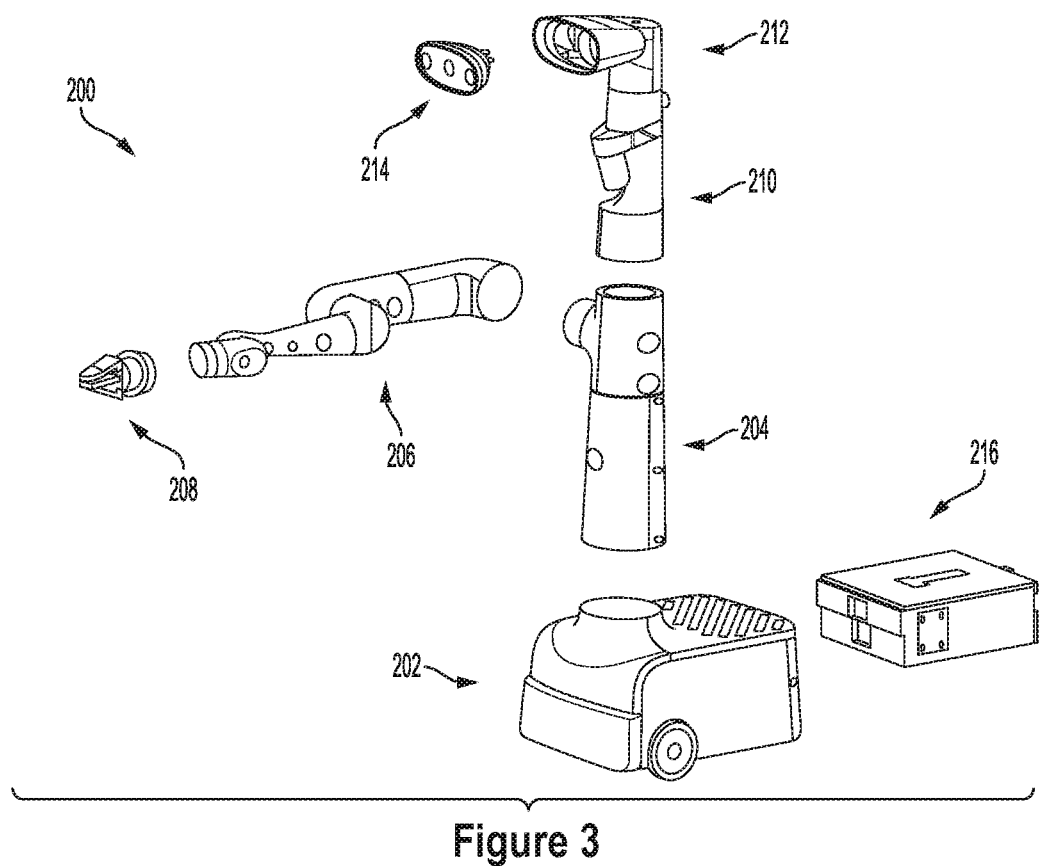
FIG. 3 illustrates an exploded view of a mobile robot, in accordance with example embodiments.

FIG. 2 illustrates a mobile robot, in accordance with example embodiments. FIG. 3 illustrates an exploded view of the mobile robot, in accordance with example embodiments. More specifically, a robot 200 may include a mobile base 202, a torso 204, an arm 206, an end-of-arm system (EOAS) 208, a neck 210, a head 212, and a perception system 214. The robot 200 may also include a compute box 216 stored within mobile base 202.

The mobile base 202 includes two drive wheels positioned at a front end of the robot 200 in order to provide locomotion to robot 200. The mobile base 202 also includes additional casters (not shown) to facilitate motion of the mobile base 202 over a ground surface. The mobile base 202 may have a modular architecture that allows compute box 216 to be easily removed. Compute box 216 may serve as a removable control system for robot 200 (rather than a mechanically integrated control system). After removing external shells, the compute box 216 can be easily removed and/or replaced. The mobile base 202 may also be designed to allow for additional modularity. For example, the mobile base 202 may also be designed so that a power system, a battery, and/or external bumpers can all be easily removed and/or replaced.

The torso 204 may be attached to the mobile base 202 at a front end of the mobile base 202. The torso 204 includes a mounting column which is fixed to the mobile base 202. The torso 204 additionally includes a rotational joint for arm 206. More specifically, the torso 204 includes the first two degrees of freedom for arm 206 (a shoulder yaw J0 joint and a shoulder pitch J1 joint). The mounting column and the shoulder yaw J0 joint may form a portion of a stacked tower at the front of mobile base 202. The mounting column and the shoulder yaw J0 joint may be coaxial. The length of the mounting column of torso 204 may be chosen to provide the arm 206 with sufficient height to perform manipulation tasks at commonly encountered height levels (e.g., coffee table top and counter top levels). The length of the mounting column of torso 204 may also allow the shoulder pitch J1 joint to rotate the arm 206 over the mobile base 202 without contacting the mobile base 202.

The arm 206 may be a 7DOF robotic arm when connected to the torso 204. As noted, the first two DOFs of the arm 206 may be included in the torso 204. The remaining five DOFs may be included in a standalone section of the arm 206 as illustrated in FIGS. 2 and 3. The arm 206 may be made up of plastic monolithic link structures. Inside the arm 206 may be housed standalone actuator modules, local motor drivers, and thru bore cabling.

The EOAS 208 may be an end effector at the end of arm 206. EOAS 208 may allow the robot 200 to manipulate objects in the environment. As shown in FIGS. 2 and 3, EOAS 208 may be a gripper, such as an underactuated pinch gripper. The gripper may include one or more contact sensors such as force/torque sensors and/or non-contact sensors such as one or more cameras to facilitate object detection and gripper control. EOAS 208 may also be a different type of gripper such as a suction gripper or a different type of tool such as a drill or a brush. EOAS 208 may also be swappable or include swappable components such as gripper digits.

The neck 210 may be a relatively long, narrow component between the shoulder yaw J0 joint for arm 206 and head 212. The neck 210 may be part of the stacked tower at the front of mobile base 202. The neck 210 may be coaxial with the torso 204. The length of the neck 210 may facilitate perception by the head 212 of objects being manipulated by EOAS 208. The neck 210 may have a length such that when the shoulder pitch J1 joint is rotated vertical up, a topmost point of a bicep of the arm 206 is approximately aligned with a top of the neck 210. The length of the neck 210 may then be sufficient to prevent a collision between the head 212 and the arm 206 when the shoulder pitch J1 joint is rotated vertical up.

As shown in FIGS. 2 and 3, the neck 210 may include a lidar sensor. The lidar sensor may be a spinning three-dimensional (3D) depth sensor. The lidar sensor may be coupled to a carved out portion of the neck 210 fixed at a downward angle. The lidar position may be optimized for localization, navigation, and for front cliff detection.

The head 212 may include at least one sensor making up perception system 214. The head 212 may be connected to a pan/tilt control to allow for reorienting of the head 212 (e.g., to view objects being manipulated by EOAS 208). The head 212 may be a part of the stacked tower fixed to the mobile base 202. A rear portion of the head 212 may be coaxial with the neck 210.

The perception system 214 may include a suite of sensors configured to collect sensor data representative of the environment of the robot 200. The perception system 214 may include an infrared (IR)-assisted stereo depth sensor. The perception system 214 may additionally include a wide-angled red-green-blue (RGB) camera for human-robot interaction and context information. The perception system 214 may additionally include a high resolution RGB camera for object classification. A face light ring surrounding the head 212 may also be included for improved human-robot interaction and scene illumination.

Figure 4:
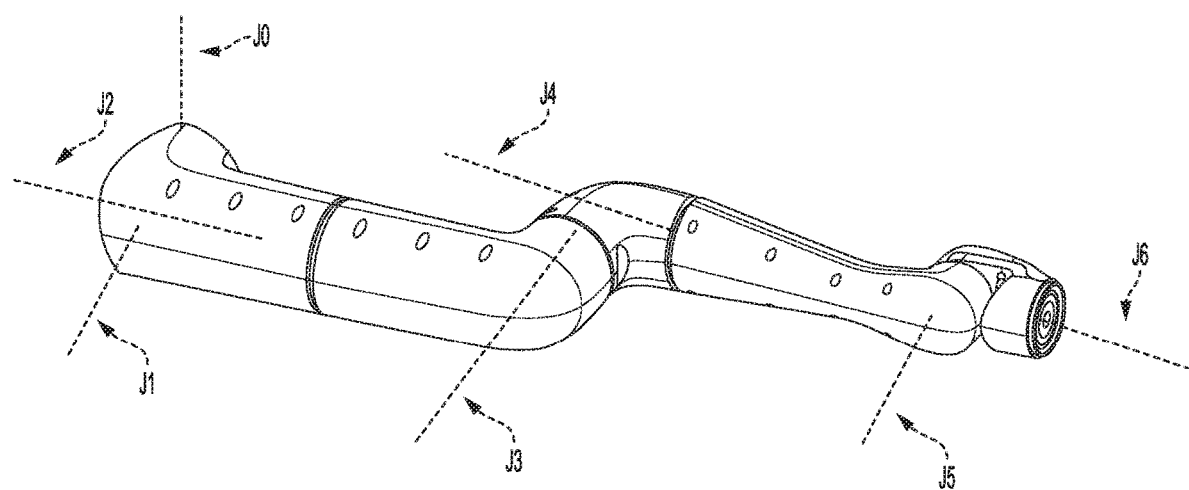
FIG. 4 illustrates a robotic arm, in accordance with example embodiments.

FIG. 4 illustrates a robotic arm, in accordance with example embodiments. The robotic arm includes 7 DOFs: a shoulder yaw J0 joint, a shoulder pitch J1 joint, a bicep roll J2 joint, an elbow pitch J3 joint, a forearm roll J4 joint, a wrist pitch J5 joint, and wrist roll J6 joint. Each of the joints may be coupled to one or more actuators. The actuators coupled to the joints may be operable to cause movement of links down the kinematic chain (as well as any end effector attached to the robot arm).

The shoulder yaw J0 joint allows the robot arm to rotate toward the front and toward the back of the robot. One beneficial use of this motion is to allow the robot to pick up an object in front of the robot and quickly place the object on the rear section of the robot (as well as the reverse motion). Another beneficial use of this motion is to quickly move the robot arm from a stowed configuration behind the robot to an active position in front of the robot (as well as the reverse motion).

The shoulder pitch J1 joint allows the robot to lift the robot arm (e.g., so that the bicep is up to neck level on the robot) and to lower the robot arm (e.g., so that the bicep is just above the mobile base). This motion is beneficial to allow the robot to efficiently perform manipulation operations (e.g., top grasps and side grasps) at different target height levels in the environment. For instance, the shoulder pitch J1 joint may be rotated to a vertical up position to allow the robot to easily manipulate objects on a table in the environment. The shoulder pitch J1 joint may be rotated to a vertical down position to allow the robot to easily manipulate objects on a ground surface in the environment.

The bicep roll J2 joint allows the robot to rotate the bicep to move the elbow and forearm relative to the bicep. This motion may be particularly beneficial for facilitating a clear view of the EOAS by the robot's perception system in the head. By rotating the bicep roll J2 joint, the robot may kick out the elbow and forearm to improve line of sight to an object held in a gripper of the robot.

Moving down the kinematic chain, alternating pitch and roll joints (a shoulder pitch J1 joint, a bicep roll J2 joint, an elbow pitch 3 joint, a forearm roll J4 joint, a wrist pitch J5 joint, and wrist roll J6 joint) are provided to improve the manipulability of the robotic arm. The axes of the wrist pitch J5 joint, the wrist roll J6 joint, and the forearm roll J4 joint are intersecting for reduced arm motion to reorient objects. The wrist roll J6 point is provided instead of two pitch joints in the wrist in order to improve object rotation.

In some examples, a robotic arm such as the one illustrated in FIG. 4 may be capable of operating in a teach mode. In particular, teach mode may be an operating mode of the robotic arm that allows a user to physically interact with and guide robotic arm towards carrying out and recording various movements. In a teaching mode, an external force is applied (e.g., by the user) to the robotic arm based on a teaching input that is intended to teach the robot regarding how to carry out a specific task. The robotic arm may thus obtain data regarding how to carry out the specific task based on instructions and guidance from the user. Such data may relate to a plurality of configurations of mechanical components, joint position data, velocity data, acceleration data, torque data, force data, and power data, among other possibilities.

During teach mode the user may grasp onto the EOAS or wrist in some examples or onto any part of robotic arm in other examples, and provide an external force by physically moving robotic arm. In particular, the user may guide the robotic arm towards grasping onto an object and then moving the object from a first location to a second location. As the user guides the robotic arm during teach mode, the robot may obtain and record data related to the movement such that the robotic arm may be configured to independently carry out the task at a future time during independent operation (e.g., when the robotic arm operates independently outside of teach mode). In some examples, external forces may also be applied by other entities in the physical workspace such as by other objects, machines, or robotic systems, among other possibilities.

Figure 5:
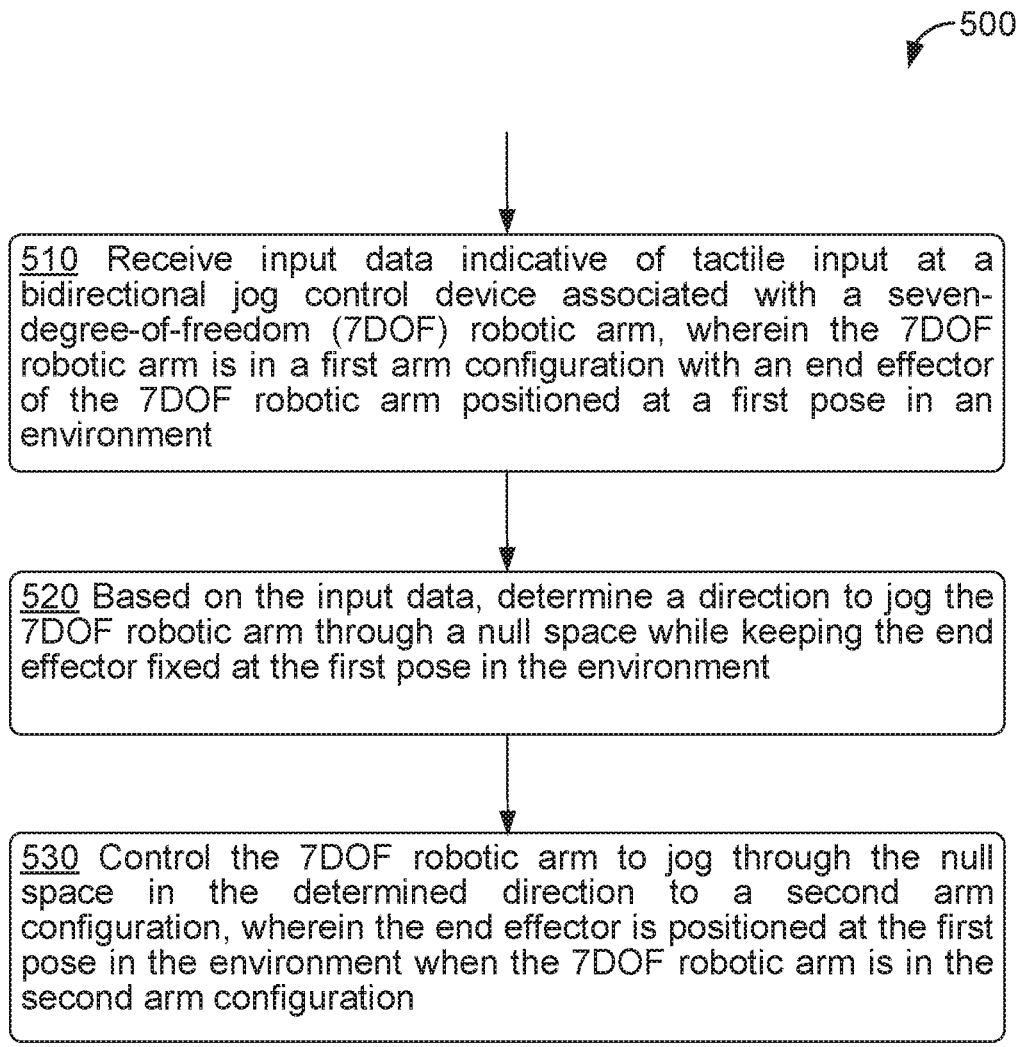
FIG. 5 is a block diagram of a method, in accordance with example embodiments.

FIG. 5 is a block diagram of a method, in accordance with example embodiments. In some examples, method 500 of FIG. 5 may be carried out by a control system, such as control system 118 of robotic system 100. In further examples, method 500 may be carried by one or more processors, such as processor(s) 102, executing program instructions, such as program instructions 106, stored in a data storage, such as data storage 104. Execution of method 500 may involve a robotic device with a robotic arm, such as illustrated and described with respect to FIGS. 2-4. Other robotic devices may also be used in the performance of method 500. In further examples, some or all of the blocks of method 500 may be performed by a control system remote from the robotic device. In yet further examples, different blocks of method 500 may be performed by different control systems, located on and/or remote from a robotic device.

At block 510, method 500 includes receiving input data indicative of tactile input at a bidirectional jog control device. The jog control device may be associated with a seven-degree-of-freedom (7DOF) robotic arm. When the input data is received, the 7DOF robotic arm may be in a first arm configuration with an end effector of the 7DOF robotic arm positioned at a first pose in an environment.

The tactile input may involve any type of physical user interaction with the jog control device, including manipulation performed by a user's hand, fingers, feet, or other body parts. The bidirectional jog control device is a physical component that enables user input to specify movement of a robotic arm through the null space in either of two opposite directions. Examples of the bidirectional jog control device include, but are not limited to, a rocker switch, two opposing switches, two buttons, a center-return knob, a click wheel, a twistable ring, a slider mechanism, a joystick, or a foot pedal. In some examples, the jog control device may return to a neutral or center position when no pressure is applied to the device. In further examples, the jog control device may be pressure-sensitive such that the device detects different amounts of pressure in either direction.

In some examples, the jog control device may be physically coupled to the robotic device. In such examples, the jog control device may be coupled to the robotic arm, such as proximate to (at or nearby) the elbow of the robotic arm, or proximate to (at or nearby) the wrist or end effector of the robotic arm. The jog control device may also be coupled to a different part of the robotic arm, or to a different part of the robotic system. In further examples, the jog control device may be physically disconnected from the robotic device.

Regardless of where the jog control device is physically located, it may be associated with a 7DOF robotic arm. Input data collected by the jog control device may be communicated to a control system of the robot or 7DOF robotic arm via a wired or wireless connection. Functions of the method 500 may also be performed by a local control system of the jog control device itself.

When the user interacts with the jog control device, the 7DOF robotic arm may be in a first arm configuration. The first arm configuration refers to a set of joint angles that places the end effector of the 7DOF robotic arm at a chosen pose in the environment. The first arm configuration may also be designated by a slider value indicative of an amount (e.g., a percentage) by which the robotic arm has been moved through the null space in one direction while keeping the end effector at the chosen pose in the environment. In some examples, the pose in the environment may have been selected by a user by physically manipulating the end effector or wrist to cause a force/torque sensor at the end effector or wrist to sense the user's interactions. When the robotic device is operating in a teach mode, the first arm configuration may be stored along with the pose of the end effector as a waypoint that the robotic device may move to at a later time when operating autonomously.

At block 520, method 500 further involves determine a direction to jog the 7DOF robotic arm through the null space while keeping the end effector fixed at the first pose in the environment. The direction to jog the 7DOF robotic arm may be determined based on input data indicative of how a user is manipulating the jog control device. In some examples, manipulating the jog control device in one direction will cause the 7DOF robotic arm to jog through the null space in one direction, and manipulating the jog control device in a second direction will cause the 7DOF robotic arm to jog through the null space in the opposite direction. In further examples, manipulating a first switch, button, or other control mechanism will cause the 7DOF robotic arm to jog through the null space in one direction, and manipulating a second switch, button, or other control mechanism will cause the 7DOF robotic arm to jog through the null space in the other direction.

Input data based on user interaction with the jog control device may at a minimum indicate a direction in which to jog the 7DOF robotic arm through the null space. In some examples, in addition to direction, the input data may also control other aspects of the motion of the 7DOF robotic arm through the null space. Such aspects may include a speed or a rate of motion of the 7DOF robotic arm. For instance, based on the input data, the 7DOF robotic arm may be controlled to move ten percent through the null space every five seconds. The input data may indicate a speed at which to jog the 7DOF robotic arm based on the amount by which the jog control device is moved in one direction and/or based on the amount of pressure being applied to the jog control device.

In some examples, the 7DOF robotic arm may be continuously jogged through the null space in the indicated direction for the duration of user input provided to the jog control device (or until an extreme end of the null space is reached). In other examples, the 7DOF robotic arm may be incrementally jogged through the null space in the determined direction at a fixed time interval. In examples where the 7DOF robotic arm is moved in increments, the input data may also indicate the amount of motion for each increment and/or an amount of time delay between consecutive incremental motions. In further examples, interaction with the jog control device may indicate an absolute amount of motion of the 7DOF robotic arm through the null space rather than continuous or periodic motion.

At block 530, method 500 further includes controlling the 7DOF robotic arm to jog through the null space in the determined direction to a second arm configuration. The end effector may still be positioned at the first pose in the environment when the 7DOF robotic arm is in the second arm configuration. More specifically, the end effector may remain fixed at the first pose while the arm configuration moves from the first arm configuration to the second arm configuration. In order to achieve this motion, the joints of the 7DOF robotic arm may be controlled to move in proportion to the joint-configuration-specific Jacobian null space basis vector. Thus, the joints may all move simultaneously in order to achieve motion of the 7DOF robotic arm through the null space while keeping the end effector fixed.

Motion of the 7DOF robotic arm from the first arm configuration to the second arm configuration may be controlled to occur at a certain predetermined rate, or the rate may be varied based on user input data. The motion may be periodic or continuous. In further examples, a fixed amount of motion may occur to cause the robotic arm to traverse a predetermined portion of the null space for each discrete user interaction (e.g., button press) with the jog control device.

When the robotic arm is operating in teach mode, a waypoint may be stored when the 7DOF robotic arm is in the second arm configuration. The waypoint may include information about the pose of the end effector as well as the joint angles (or relative amount of motion through the null space) to allow the robot to position the 7DOF robotic arm in the second arm configuration at a later time. In some examples, separate waypoints may be stored for each of the first arm configuration and the second arm configuration. Additional waypoints for arm configurations within the null space between the first arm configuration and the second arm configuration may also be stored.

FIGS. 6A, 6B, 6C, and 6D illustrate user-controlled motions of a 7DOF robotic arm, in accordance with example embodiments. The user-controlled motions may include a combination of physical interactions with a robotic arm or end effector that are detected by a force/torque sensor as well as physical interactions with a jog control device (in this example, a bidirectional switch).

Figure 6A:
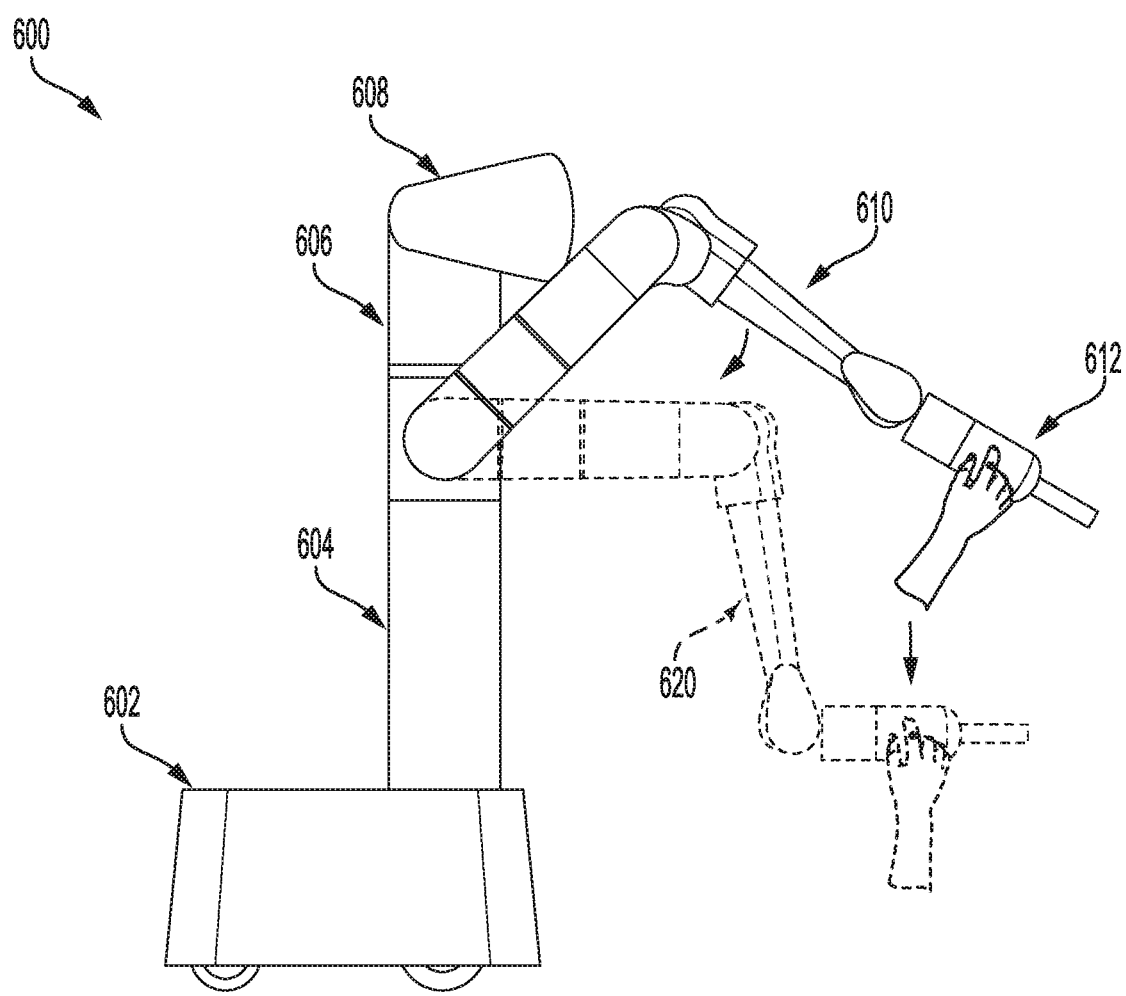
FIGS. 6A, 6B, 6C, and 6D illustrate user-controlled motions of a 7DOF robotic arm, in accordance with example embodiments.

FIG. 6A illustrates a 7DOF robotic arm being controlled by a user to move from a first configuration to a second configuration. More specifically, a robot 600 may include a base 602, a torso 604, a neck 606, a head 608. The robot 600 may be the same or similar to the robot illustrated and described with respect to FIGS. 2-4. The robot 600 may additionally include a 7DOF robot arm, initially positioned in a first configuration 610. The robot 600 may be operating in a teach mode in which the 7DOF robotic arm is manually movable by a user. More specifically, the 7DOF robotic arm may be controlled to move in response to physical contact by a user's hand at or near the end effector or wrist of the 7DOF robotic arm, based on sensor data from a force/torque sensor. The 7DOF robotic arm may lack joint-level force/torque sensing throughout the robotic arm for cost considerations.

As shown in FIG. 6A, a user may control the 7DOF robotic arm to move the arm from the first configuration 610 to a second configuration 620 in order to adjust the pose of the end effector to a desired pose. Because the robotic arm has seven degrees of freedom, there exist multiple possible combinations of joint angles that allow the end effector to be positioned in the environment at the desired pose. The joint angles of the second configuration 620 may be determined automatically by an algorithm that, for instance, keeps the 7DOF robotic arm as far away from a singularity as possible, optimizes for least distal mass, minimizes overall arm motion, and/or based on other factors or combinations of factors. In some examples, the joint angles automatically chosen for the second configuration 620 are not optimal based on factors that the user rather than the robot is considering (or capable of considering). Accordingly, the user may wish to change the arm configuration while keeping the end effector at the chosen pose in the environment.

More specifically, a real-world environment may have numerous obstacles that a robot needs to avoid when operating in the environment. Particularly where the robot needs to operate in tight spaces, it may be difficult for an operator to express robotic arm configurations to avoid collisions with obstacles in the environment. For instance, an operator may select a pose for an end effector to cause the robot to open a handle of a drawer on a dresser. However, the default arm configuration may cause the elbow of the robotic arm to collide with the dresser when the end effector is at the selected pose. In this example and others, it may be desirable for an operator to be provided with a rocker switch or other jog control device to avoid such collisions.

Figure 6B:
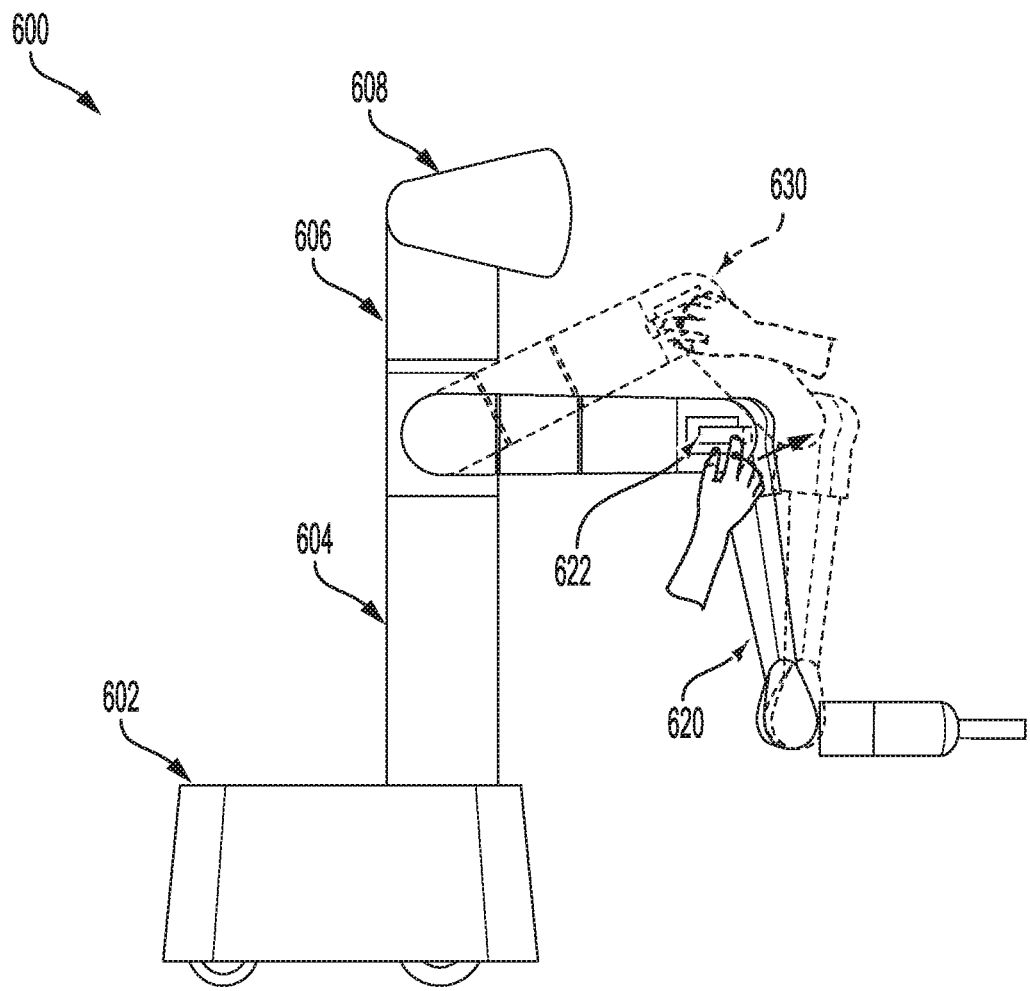

FIG. 6B illustrates the 7DOF robotic arm being controlled by the user to move from the second configuration to a third configuration. More specifically, the user may operate a bidirectional jog control device in order to cause the 7DOF robotic arm to jog through the null space while keeping the end effector fixed in space. In this case, the jog control device is a rocker switch 622 located at the elbow of the 7DOF robotic arm. Because motion through the null space often involves significant rotation of the elbow, locating the jog control device at the elbow may provide an intuitive user control mechanism. Pushing the switch causes the robotic arm to move from the second configuration 620 to a third configuration 630 while keeping the end effector fixed.

Motion between the second configuration 620 to the third configuration 630 may be continuous as long as the rocker switch 622 is pressed in the same direction by the user. In other examples, the motion may be incremental (e.g., an incremental motion every second as long as the rocker switch 622 is pressed in the same direction). In further examples, the rocker switch 622 may be pressure-sensitive such that additional pressure increases the rate at which the 7DOF robotic arm moves from the second configuration 620 to the third configuration 630. In additional examples, the rocker switch returns to a neutral center position when no pressure is applied, which may stop motion of the robotic arm through the null space. In further examples, each individual press on the rocker switch followed by a return to neutral position may cause a predetermined amount of motion of the 7DOF robotic arm through the null space.

Figure 6C:
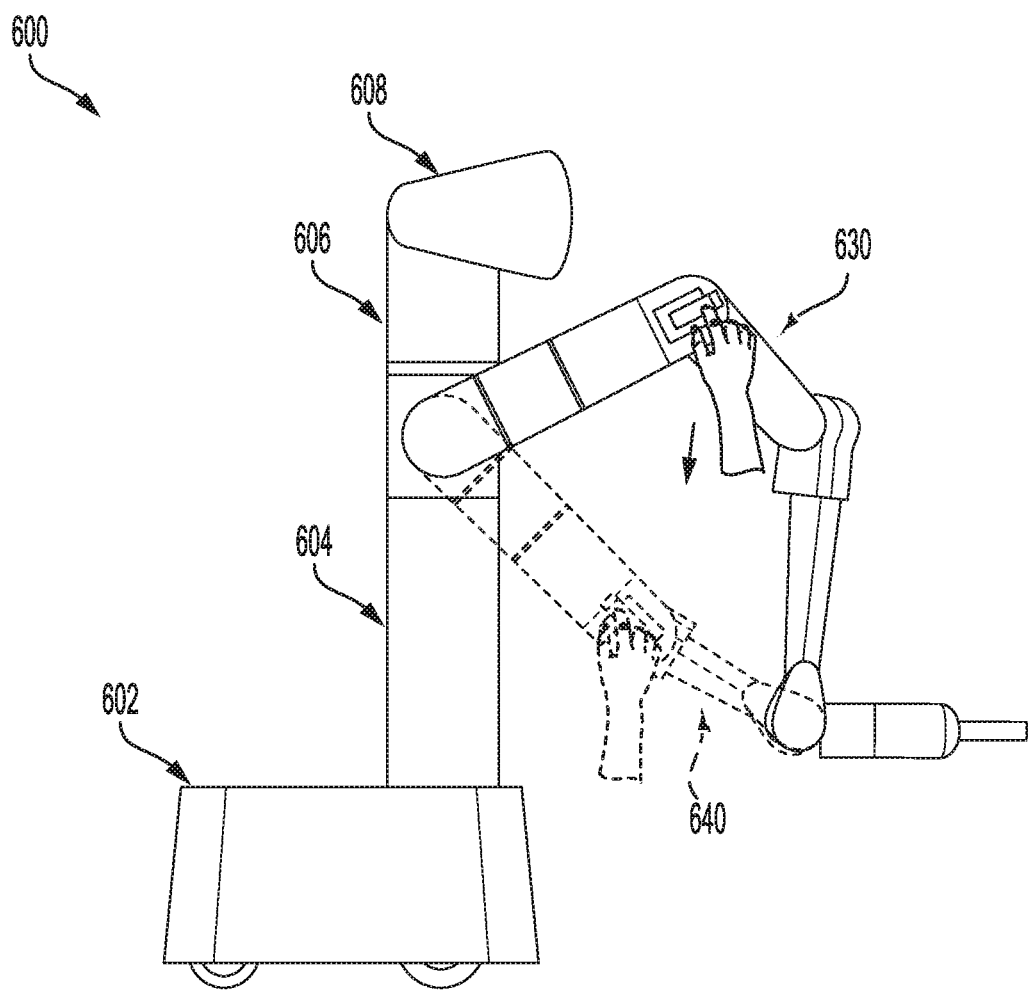

FIG. 6C illustrates the 7DOF robotic arm being controlled by the user to move from the third configuration to a fourth configuration. More specifically, a user may operate the rocker switch in the opposite direction in order to cause the 7DOF robotic arm to jog through the null space in the opposite direction. In this example, the 7DOF robotic arm may be controlled to jog from the third configuration 630 to a fourth configuration 640 while keeping the end effector fixed in space. In order to reach the fourth configuration 640, the 7DOF robotic arm may be controlled to move through the second configuration 620 illustrated in FIG. 6B.

In this manner, a user may be provided with a mechanism to easily select a preferred arm configuration in the null space (e.g., to avoid obstacles in the environment) after a position for the end effector has been manually selected by the user. In some examples, if the user selects an arm configuration in the null space (e.g., the fourth configuration 640) and then subsequently adjusts the end effector position again, the selected arm configuration in the previous null space may be used to determine where in the subsequent null space to set the arm configuration after the end effector position is adjusted. In particular, rather than allowing a configuration-setting algorithm to independently determine the new arm configuration, an arm configuration may be determined to maintain the relative null space position. Accordingly, a user may not be required to fully reset the arm configuration (including, for example, the relative elbow position) after every motion of the end effector.

Figure 6D:
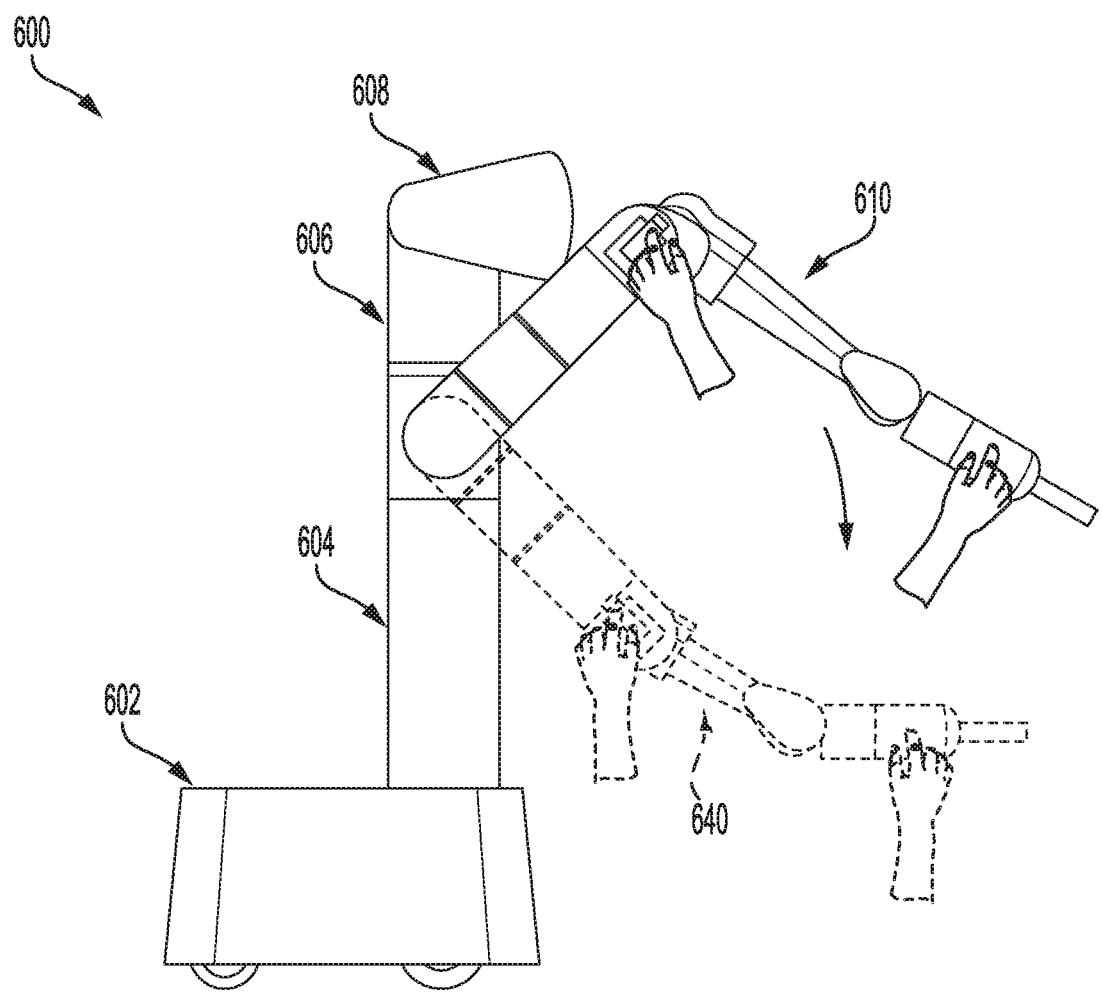

FIG. 6D illustrates the 7DOF robotic arm being controlled by the user to move directly from the first configuration to the fourth configuration. More specifically, by using one hand to physically move the end effector or wrist, and another hand to operate the rocker switch, the user may control the 7DOF robotic arm to move directly from the first configuration 610 to the fourth configuration 640. This motion may involve the user alternating between moving the end effector or wrist and pressing the rocker switch, or in some cases, the control actions may be performed by the user's two hands simultaneously.

In this manner, a user may be provided with a control scheme that allows the user to use both hands to quickly achieve a desired arm configuration. An alternative control scheme for a robot with joint-level force/torque sensing throughout the arm could achieve a similar outcome, but at a substantially greater implementation cost. Without the rocker switch, a user working with a robotic arm that only has a force/torque sensor at or near the end effector may find it difficult to achieve a desired arm configuration within the null space (e.g., to avoid obstacles in the environment). In some examples, a rocker switch or alternative jog control device provides an elegant and cost-efficient solution to this problem.

As mentioned, the jog control device can take on a number of different form factors. In some examples, the jog control device may include two separate switches (or other control mechanisms) to indicate motion through the null space in either of two opposite directions. In such examples, the two switches or other control mechanisms may be positioned opposite each other (e.g., 180 degrees opposite each other) on or proximate to an elbow of a 7DOF robotic arm.

In these examples and other examples, which direction to jog the 7DOF robotic arm through the null space may be determined by the sign of a joint directly upstream from the elbow. More specifically, a sign for a bicep roll J2 actuator in the 7DOF robotic arm may be determined based on user input data so that activating a jog control device moves the arm in a direction consistent with the direction that the user is pressing on the jog control device. For instance, pushing a button on one side of the elbow moves the 7DOF robotic arm away from the user's hand in one direction through the null space, and similarly pushing another button on an opposite side of the elbow moves the 7DOF robotic arm away from the user's hand in the opposite direction through the null space. In general, a direction to move the arm through the null space may be chosen to be the more intuitive direction based on how the user is interacting with the jog control device.

In further examples, the jog control device may include a center-return knob. Turning the knob in one direction may cause a 7DOF robotic arm to jog through the null space in one direction. Turning the knob in the other direction may cause the 7DOF robotic arm to jog through the null space in the other direction. Releasing the knob may cause the knob to return (e.g., via a spring mechanism) to a neutral position in which the the 7DOF robotic arm stops jogging through the null space. In some examples, as the knob is turned further in one direction, the rate of motion of the 7DOF robotic arm in jogging through the null space is increased. For instance, if continuous motion is used, the 7DOF robotic arm may be controlled to move through the null space with greater speed. If periodic motion is used, the 7DOF robotic arm may be controlled to move in larger increments and/or the time between consecutive incremental motions may be decreased. By using a knob that returns to a neutral center position, a user may cause the robot to stop jogging through the null space simply by releasing the jog control device, which may be preferable for safety reasons.

In further examples, the jog control device may include a click wheel similar to a volume control knob. In this case, motion of the click wheel may cause a 7DOF robotic arm to move a discrete amount through the null space. Because the motion is not continuous in this case, it is not necessary to return the knob to a neutral position. Each time the user causes the click wheel to click in a particular direction, the 7DOF robotic arm is controlled to move another increment through the null space.

In yet further examples, the jog control device may take on one of a number of other possible mechanical forms. Such examples include a joystick, a twistable ring mechanism, a slider mechanism, or a foot pedal. This list is not meant to be exhaustive. Any number of other mechanical devices that allow for input to provide bidirectional control may also be used in line with the present disclosure.

In further examples, user preferences in specifying arm configurations within the null space may be used to train a machine learning model to automatically select future arm configurations. More specifically, if a particular user or multiple users consistently adjust a 7DOF robotic arm's configuration within the null space, this information may be used to adapt an algorithm which automatically selects arm configurations in an effort to reduce the need for future adjustments. Such use of a machine learning model is application specific, however. In general, it may be beneficial to provide operators of learning robots with a low-cost control mechanism to easily control a 7DOF robotic arm (or perhaps a robotic arm with greater than 7DOFs) to jog through the null space.

In examples where the robotic arm has more than 7DOFs, input data provided to one or multiple jog control devices may be used to determine one or multiple directions to jog the robotic arm through a multidimensional null space. For instance, in the case of an 8DOF robotic arm, input data received at two different switches may indicate two directions to jog the robotic arm along two different dimensions of the null space. In further examples, multidimensional null space jogs may also be enabled for arms with greater than 8DOFs.

III. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:
1. A method comprising:
receiving input data indicative of tactile input at a bidirectional jog control device associated with a seven-degree-of-freedom (7DOF) robotic arm, wherein the 7DOF robotic arm is in a first arm configuration with an end effector of the 7DOF robotic arm positioned at a first pose in an environment, wherein the bidirectional jog control device comprises a rocker switch;
based on the input data, determining a direction to jog the 7DOF robotic arm through a null space while keeping the end effector fixed at the first pose in the environment;
controlling the 7DOF robotic arm to jog through the null space in the determined direction to a second arm configuration, wherein the end effector is positioned at the first pose in the environment when the 7DOF robotic arm is in the second arm configuration; and when the rocker switch is held in one direction, controlling the 7DOF robot arm to continue making movements through the null space in the determined direction at a fixed time interval.

2. The method of claim 1, wherein the bidirectional jog control device is attached to the 7DOF robotic arm.

3. The method of claim 2, wherein the bidirectional jog control device is located proximate to an elbow of the 7DOF robotic arm.

4. The method of claim 2, wherein the bidirectional jog control device is located proximate to a wrist of the 7DOF robotic arm.

5. The method of claim 1, wherein the rocker switch returns to a center position when no pressure is applied to the rocker switch, wherein returning the rocker switch to the center position stops jogging of the 7DOF robotic arm through the null space.

6. The method of claim 1, wherein the rocker switch is pressure sensitive, wherein an amount of pressure applied to the rocker switch controls a rate of motion at which the 7DOF robotic arm jogs through the null space.

7. The method of claim 1, wherein the bidirectional jog control device comprises two switches, each switch associated with jogging of the 7DOF robotic arm through the null space in a respective direction of two opposite directions.

8. The method of claim 7, wherein the two switches are positioned opposite each other proximate to an elbow of the 7DOF robotic arm.

9. The method of claim 1, wherein the bidirectional jog control device comprises a click wheel, wherein each click of the click wheel is associated with a fixed amount of movement of the 7DOF robotic arm through the null space.

10. The method of claim 1, wherein the bidirectional jog control device comprises a center-return knob, wherein an amount of rotation of the center-return knob in a particular direction is associated with a rate of motion at which the 7DOF robotic arm jogs through the null space.

11. The method of claim 1, wherein the bidirectional jog control device causes a fixed amount of movement of the 7DOF robotic arm for each discrete user interaction with the bidirectional jog control device.

12. The method of claim 1, further comprising storing a waypoint associated with the first pose of the end effector and the second arm configuration of the 7DOF robotic arm.

13. The method of claim 1, wherein determining the direction to jog the 7DOF robotic arm through the null space comprises determining a sign for a bicep roll J2 actuator in the 7DOF robotic arm based on the input data.

14. The method of claim 1, further comprising:
controlling the 7DOF robotic arm to position the end effector at a second pose in the environment based on force/torque data determined using a force/torque sensor positioned proximate to the end effector, wherein the 7DOF robotic arm is configured in a third arm configuration to position the end effector at the second pose in the environment, wherein the third arm configuration is determined based at least in part on the second arm configuration.

15. A robotic device comprising:
a robotic arm having an end effector, wherein the robotic arm has at least seven degrees of freedom (7DOFs);
at least one bidirectional jog control device; and
a control system configured to:
receive input data indicative of tactile input at the at least one bidirectional jog control device associated with the robotic arm, wherein the robotic arm is in a first arm configuration with the end effector of the robotic arm positioned at a first pose in an environment wherein the at least one bidirectional jog control device comprises a first switch on a first side of an elbow of the robotic arm and a second switch on a second side of the elbow of the robotic arm, wherein the first side of the elbow is opposite the second side of the elbow;
based on the input data, determine at least one direction to jog the robotic arm through a null space while keeping the end effector fixed at the first pose in the environment; and
control the robotic arm to jog through the null space in the at least one determined direction to a second arm configuration, wherein the end effector is positioned at the first pose in the environment when the robotic arm is in the second arm configuration.

16. The robotic device of claim 15, wherein the robotic arm has more than 7DOFs, and wherein the control system is configured to jog the robotic arm through multiple dimensions of the null space based on the input data.

17. A method comprising:
receiving input data indicative of tactile input at a bidirectional jog control device associated with a 7DOF robotic arm, wherein the 7DOF robotic arm is in a first arm configuration with an end effector of the 7DOF robotic arm positioned at a first pose in an environment, wherein the bidirectional jog control device comprises a rocker switch;
based on the input data, determining a direction to jog the 7DOF robotic arm through a null space while keeping the end effector fixed at the first pose in the environment; and
controlling the 7DOF robotic arm to jog through the null space in the determined direction to a second arm configuration, wherein the end effector is positioned at the first pose in the environment when the 7DOF robotic arm is in the second arm configuration, wherein the rocker switch returns to a center position when no pressure is applied to the rocker switch, wherein returning the rocker switch to the center position stops Jogging of the 7DOF robotic arm through the null space.

* * * * *